Feb. 18, 1958 W. B. EDDISON 2,823,816
SEAL TRANSFERRING APPARATUS
Filed Feb. 12, 1954 3 Sheets-Sheet 1

INVENTOR.
William Barton Eddison
BY
Andrus & Scales
ATTORNEYS.

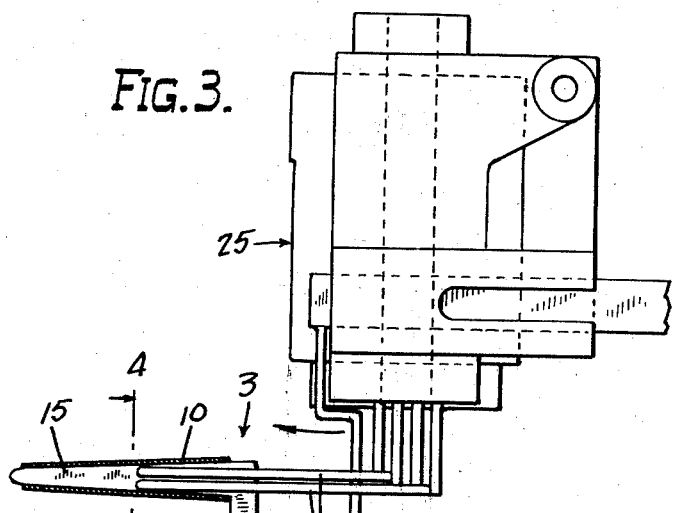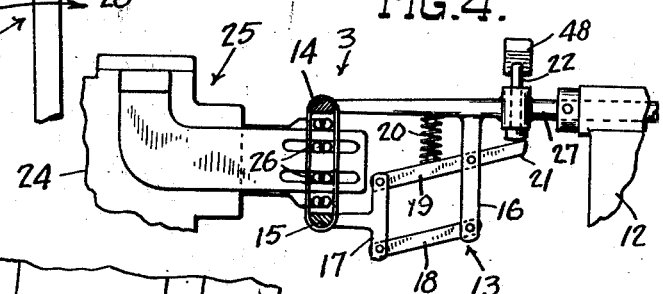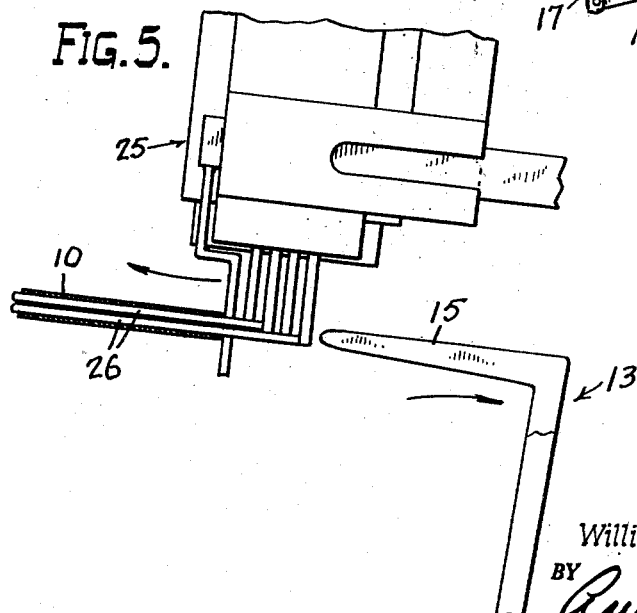

Feb. 18, 1958  W. B. EDDISON  2,823,816
SEAL TRANSFERRING APPARATUS
Filed Feb. 12, 1954  3 Sheets-Sheet 3

INVENTOR.
William Barton Eddison
BY
ATTORNEYS.

United States Patent Office 2,823,816
Patented Feb. 18, 1958

2,823,816
SEAL TRANSFERRING APPARATUS

William Barton Eddison, Irvington, N. Y., assignor to Gisholt Machine Company, Madison, Wis., a corporation of Wisconsin Application February 12, 1954, Serial No. 410,008

10 Claims. (Cl. 214—151)

This invention relates to a seal transferring apparatus to be employed in machines for applying tubular seals to bottle tops and the like.

In modern bottling plants speed of handling is becoming more and more important, and it is quite usual to have the bottles moving along a line at a rate of several hundred per minute. Sealing operations have to be performed at the same rate.

In apparatus for this purpose the seals are stripped from one or more magazines and carried to a transfer station where they are held partially open for successive pick-up by a two finger head having the fingers thereof adapted to enter the partially open seal as the head passes the station. Heretofore, the two finger heads have been carried by an endless chain, or the like to have a generally straight course for delivering the seals to an eight finger head similarly carried by an endless chain, the course of which overlaps in registry with the straight course of the two finger head. In such machines the eight finger heads have to travel faster than the two finger heads in order to overtake them on the straight course and pick the seals off.

As higher speeds are employed it becomes more difficult to employ endless chain conveyors for carrying the heads, and more desirable to employ simple rotating arms for this purpose. Such rotary arms can be moved in positive synchronism and registry with other parts and at any speed. The bottles can be indexed to travel in a given arc of the circular path for the eight finger heads whereby absolute registry can be attained.

However, where the circumferential path of the several conveyor elements are tangential there is not sufficient overlap of joint travel of the two heads to provide the desired transfer or pickup of the seal by the eight finger head from the two finger head. The speeds are such as to make continuous rotation a necessity.

The present invention solves the problems by providing a rotational mounting for the two finger head whereby it picks a seal up at the first transfer station with the two fingers of the head moving in the direction in which they point and whereby the two finger head is rotated on an axis at right angles to the fingers through 180° during travel of the head from the first station to the discharge or second transfer station at which the head is traveling backwards, i. e. with the fingers pointing backward, so that an eight finger head passing in the opposite direction from that of the two finger head can remove the seal from the two finger head without requiring an extended coinciding path of movement.

The corresponding two finger and eight finger heads are carried by rotating members in circular paths generally tangential to each other at the position of transfer of a seal from one head to the other.

The drawings furnished herewith illustrate somewhat schematically the best mode of carrying out the invention as presently contemplated and set forth hereinafter.

In the drawings:

Fig. 3 is a detail view showing the beginning of the transfer of a seal from a two finger head to an eight finger head;

Fig. 4 is a detail section taken on line 4—4 of Fig. 3;

Fig. 5 is a view similar to Fig. 3 showing the completion of the transfer of the seal from the two finger head to the eight finger head.

Figure 1:
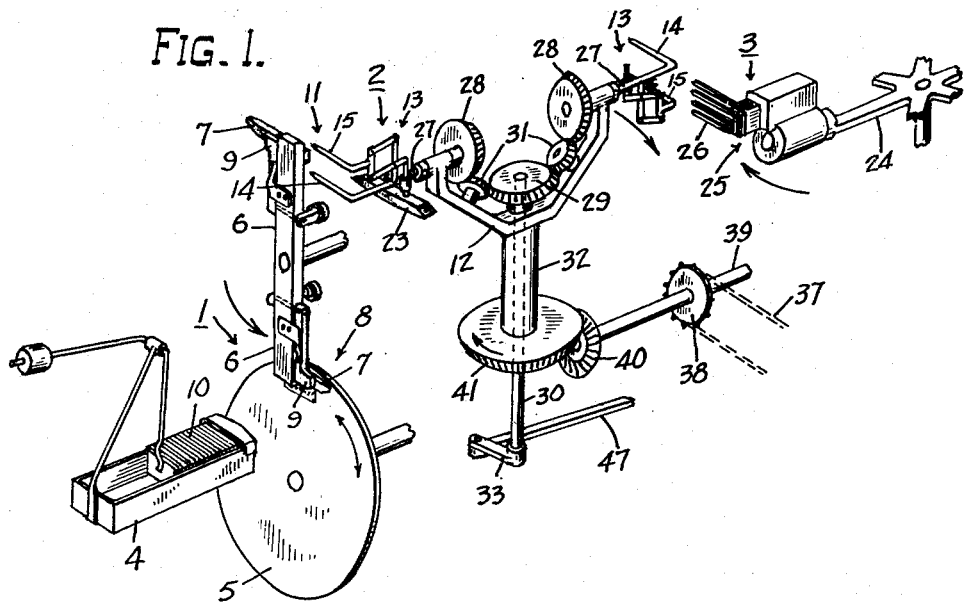
Figure 1 is a schematic showing of the transfer mechanism.
Figure 2:
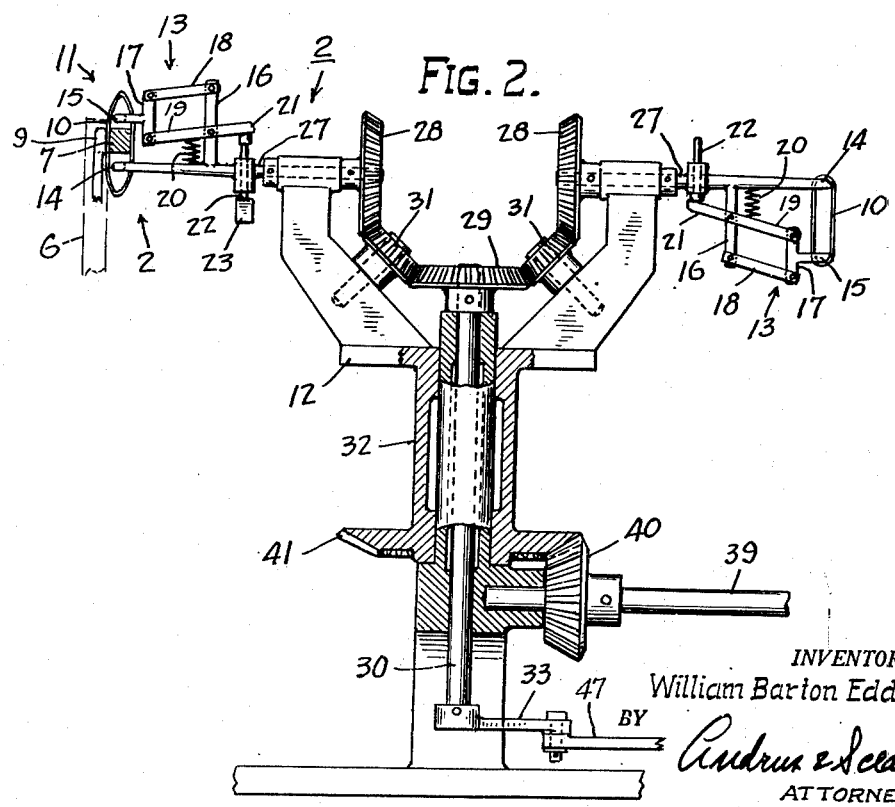
Fig. 2 is a detail vertical section of the mounting for the two finger heads showing the fingers of one head closed and those of the other separated.
Figure 6:
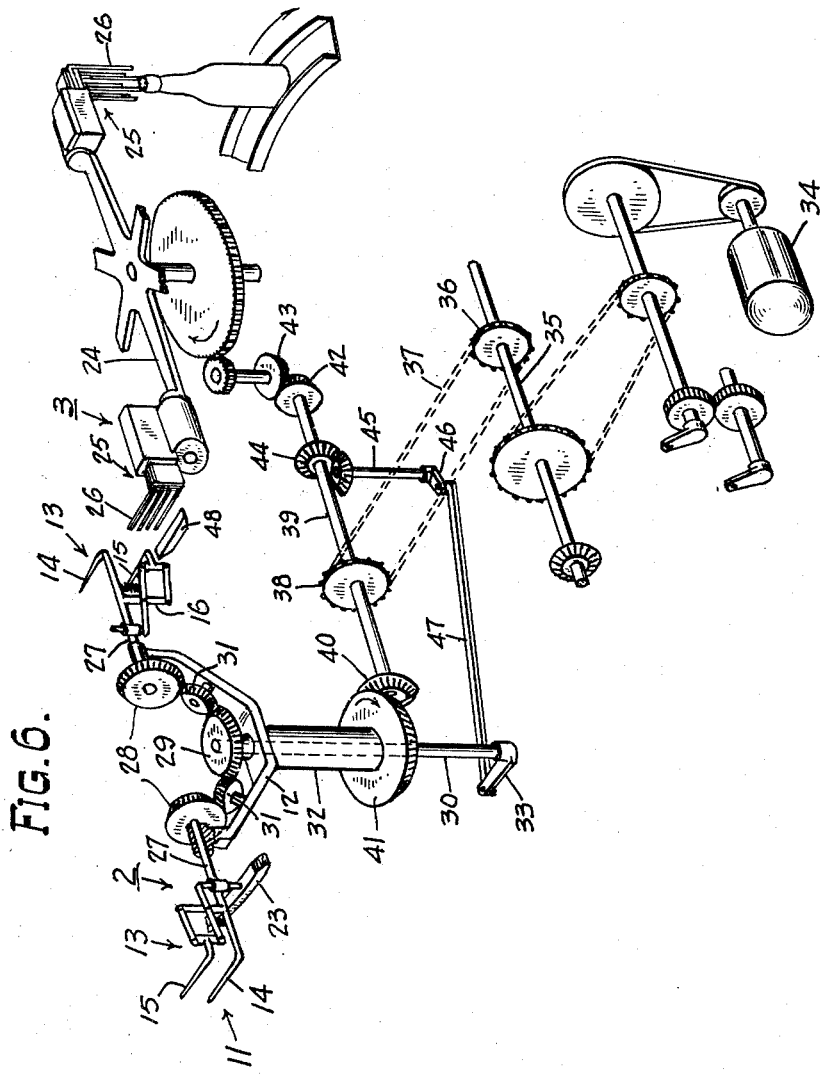
Fig. 6 is a schematic showing of the drive.

The transfer mechanism, as illustrated in the drawings, comprises a seal supply mechanism 1, a two finger head transfer mechanism 2 and an eight finger head applying mechanism 3.

The supply mechanism 1 may be any suitable mechanism for supplying seals in rapid succession at a transfer station where they can be picked up by the transfer mechanism 2. The supply mechanism 1 should present the successive seals in partially opened state for free entry of the fingers of the two finger heads, as will be described later.

A suitable mechanism 1 is that described and claimed in applicant's copending application, Serial No. 407,846 filed February 3, 1954, and which has a magazine trough 4, a stripper disc 5 for removing seals successively from the stripping end of the trough and raising them to a pick-off station, and a pick-off mechanism comprising a rotary member 6 having radial arms carrying spears 7 which enter the seals and pick them off from the disc 5.

The member 6 is adapted to dwell as a spear 7 enters a seal at the pick-up or first transfer station 8 to provide time for a clamp 9 to secure the seal upon the spear, as described in the pending application referred to. During the dwell, a seal 10 is delivered by another arm of member 6 to a second transfer station 11 where the clamp 9 is released and the mechanism 2 picks the seal off from the spear 7.

The transfer mechanism 2 comprises a continuously rotating member 12 having a pair of radial arms carrying corresponding two finger heads 13 at their outer extremities. For convenience, the axis of rotation of member 6 is shown as horizontal and the axis of rotation of member 12 is shown as vertical and the members have the same number of arms so that the drive ratio is one-to-one with respect to revolutions.

The two finger heads 13 comprise a pair of L-shaped fingers 14 and 15 arranged parallel to each other with their free ends extending generally tangential to the outermost circumferential path of travel, and their opposite ends extending generally radially of member 12.

Fingers 14 and 15 are of L shape and shown as disposed one above the other, and for the purpose of providing relative movement of the fingers toward and away from each other the rear arm of lower finger 14 constitutes the mounting for head 13 and the upper finger 15 is carried thereon by a parallelogram comprising a vertical post 16 on the rear arm of finger 14, a vertical post 17 at the rear end of the arm of finger 15, and a pair of vertically spaced parallel links 18 and 19 pivoted at corresponding opposite ends to post 16 and post 17.

A spring 20 disposed between the lower link 19 and the rear arm of finger 14 biases the parallelogram upwardly to urge the fingers 14 and 15 apart.

One of the links 18 and 19 extends rearwardly and is actuated as a lever to move finger 15 downwardly toward finger 14, compressing spring 20, by means of a vertical push rod 21 the lower end of which constitutes a cam follower 22.

The fingers 14 and 15 are normally separated by spring 20 which biases them apart. During rotation of member 12, as a head 2 approaches the pick-up or first transfer station 8, the follower 22 engages a cam 23 disposed in its path and which lifts it upwardly, thereby actuating lever 18 and pulling upper finger 15 downwardly toward lower finger 14.

As the fingers 14 and 15 advance to the transfer station 8 they travel forwardly and enter the partially open seal 10 with the fingers separated just sufficiently to pass the spear 7 therebetween. The fingers 14 and 15 pass just above and below the spear 7 in the direction toward which the spear points so that the seal 10 is picked up by the fingers as the clamp is released and while the spear dwells at station 8.

As the fingers 14 and 15 clear the spear 7 cam 23 ends and allows spring 20 to separate the fingers, thereby securely stretching the seal 10 upon the fingers.

Continued rotation of member 12 brings the head 13 to the second transfer station 11 where the mechanism 3 picks up the seal for applying it to a bottle top or the like.

Mechanism 3 comprises a rotary member 24 having a plurality of radial arms carrying eight finger heads 25 at their outer extremities. The construction of a suitable mechanism 3 and of the eight finger heads 25 is more specifically described and claimed in applicant's copending application Serial No. 410,194, filed February 15, 1954.

For the purpose of the present invention the eight finger heads 25 travel in succession in a rotary path and have their substantially parallel fingers 26 closed together for the purpose of entering the stretched seal 10 between fingers 14 and 15 as the two heads 13 and 25 pass each other in opposite directions.

According to the present invention the two finger heads 13 are rotated to a position wherein the free ends of fingers 14 and 15 are traveling backward as the heads approach the second transfer station 11, so that fingers 26 enter the seal 10 and pull it off from fingers 14 and 15 as the two heads pass each other.

For this purpose each head 13 is mounted upon a rotary shaft 27 carried in a suitable bearing in the outer end of the corresponding arm of member 12 and is rotated one complete revolution for each revolution of member 12, whereby transfer stations 8 and 11 are disposed 180° apart with respect to the rotation of member 12. Shaft 27 is shown as horizontal and generally radial to member 12, and it should be understood that the shaft may be disposed at any angle suitable for presenting fingers 14 and 15 in the desired planes for stations 8 and 11, and that the shaft should be normal to any plane containing one of the fingers.

The rotation of head 13 is effected by means of a gear 28 secured on the inner end of shaft 27 and driven by a gear 29 on the upper end of a shaft 30 coaxial with the member 12. Suitable intermediate gearing 31 may be interposed between gears 28 and 29 to provide a desirable upward advance for fingers 14 and 15 as they pick up a seal 10 at station 8. Gears 28 and 29 should have the same diameter and number of teeth for a one-to-one ratio therebetween.

If shaft 30 is held against rotation while member 12 rotates thereon, the gears 29, 31 and 28 will effect a rotation of shaft 27 and head 13 corresponding to the rotation of member 12.

Since the rotation of member 12 is constant the planetary translation of head 13 about the axis of shaft 30 is constant, and likewise the rotation of heads 13 upon the corresponding shafts 27 will be constant provided shaft 30 remains stationary.

As heads 13 approach and pass stations 8 and 11, respectively, it is desired that the fingers 14 and 15 be in a fixed tangential position substantially free from rotary movement about shaft 27 so that they properly register relative to spear 7 and fingers 26.

For this purpose shaft 30 is given a rotational oscillating movement which shortens the time of turning of the heads 13 on shaft 27 through the necessary 180° to a rotational movement of member 12 of approximately 150°, and which provides an approximate dwell in the rotation of heads 13 on shafts 27 during the remaining 30° of the rotation of member 12, for each half revolution of member 12.

Shaft 30 extends downwardly through the hub 32 of member 12 and carries a crank arm 33 at its lower end.

The drive for mechanisms 1, 2 and 3 comprises a single drive motor 34 which drives the several mechanisms in unison. The drives for mechanism 1 from motor 34 is described more specifically in the copending application first identified above.

The drive for mechanism 2 takes off from a countershaft 35 in the drive for mechanism 1 and which countershaft is driven by motor 34 through a suitable drive connection. The drive comprises a sprocket 36 on countershaft 35, chain 37 driven by sprocket 36 and in turn driving a sprocket 38 on the main drive shaft 39.

The main drive shaft 39 in turn drives hub 32 of member 12 by means of the beveled gears 40 and 41. Shaft 39 also drives member 24 by means of beveled gears 42 and 43.

A beveled gear 44 on shaft 39 drives a vertical shaft 45 mounted in suitable bearings and which has a crank 46 on the lower end. Cranks 46 and 33 are connected by a link 47 so that rotation of crank 46 effects an oscillation of crank 33 which effects an oscillation of shaft 30.

The several gears are constructed to provide a complete rotation for crank 46 for each 180° rotation of member 12, so that as head 13 passes station 8 and a similar head 13 simultaneously passes station 11, the shaft 30 is oscillated by crank 33 at a speed nearly corresponding with the rotation of member 12 and in the same direction to provide the approximate dwell in rotation of the heads 13 upon their corresponding shafts 27. At this time crank 46 will be traveling midway between dead center positions.

As heads 13 leave the corresponding stations 8 and 11 and clear the spear 7 and fingers 26, respectively, crank 46 approaches a dead center position wherein crank 33 will be held against oscillation and shaft 30 will effect rotation of heads 13 upon their corresponding shafts 27. As heads 13 approach 90° of translation from the corresponding stations 8 and 11, crank 46 reverses the oscillation of crank 33 and of shaft 30 so as to rapidly rotate the heads 13 upon their corresponding shafts 27.

The continuous rotational and crank motions involved in the driving of member 12 and heads 13 provides a smooth operation of all parts in synchronism, and a smooth acceleration and deceleration of the rotation of heads 13 in timed relation with member 12 whereby the desired positioning of fingers 14 and 15 is obtained. At station 11 a cam 48, corresponding to cam 23 actuates follower 22 and closes fingers 14 and 15 slightly to loosen seal 10 for pick up by head 25.

While the drawings show only a single magazine 4, two spears 7, two heads 13 and six heads 25, it will be understood that double the number of these elements may be employed by suitably changing drive ratios and crank lengths. In such instance the crank arm 33 should be four times the length of crank arm 46, whereas in the present drawing the ratio is two to one. Also in such instance crank arm 46 should rotate four times for each revolution of member 12, whereas in the present drawing the ratio is two to one. Likewise the member 24 is shown with a drive ratio of six to one, i. e. it revolves six times for every revolution of gear 43, and where the number of heads is doubled this ratio should be twelve to one. Also the ratio of gears 41 to 40 should then be changed from the present two to one to a ratio of four to one.

Various embodiments of the invention may be employed within the scope of the following claims which particullarly point out and distinctly claim the subject matter regarded as the invention.

I claim:

1. In seal transferring apparatus of the class described adapted to transfer a flexible tubular seal of the type employed in sealing bottles and the like from one station to another in a machine for applying the same, means to position a semi-open flexible tubular seal at a transfer station with the axis of the seal orientated for seal pick-up and with the oppositely spaced folds of the seal open and free for receiving pick-up means, a pick-up head having spaced fingers adapted to enter said open folds of the seal at said station, means to separate said fingers to expand the seal thereon, means to transfer said pick-up head to deliver the seal to a second transfer station, means to give a rotational movement to said head during said transfer whereby the fingers thereof move forwardly into the seal at said first transfer station and are reversed in direction as they approach said second transfer station to facilitate stripping of the seal therefrom, means to contract said fingers relatively toward one another at said second transfer station, and means to remove the seal from said fingers at said second transfer station.

2. In seal transferring apparatus of the class described adapted to transfer a flexible tubular seal of the type employed in sealing bottles and the like from one station to another in a machine for applying the same, a rotary member, a seal pick-up head carried by said member and having spaced fingers thereon adapted to enter and carry a seal from a first transfer station to a second transfer station adjacent said member, a rotary shaft supporting said head upon said member and adapted to hold said fingers in a plane substantially tangential to the circumferential path of translation of said head during rotation of said member as the head passes said stations, a continuous gear disposed substantially axially of said rotary member and normally held against rotation, and a gear on said shaft connected by a gear train to said first named gear whereby turning of said rotary member effects rotation of said head upon said shaft in correlation to said rotary member to reverse the direction of said fingers at said second transfer station and facilitate stripping of the seal therefrom.

3. In seal transferring apparatus of the class described adapted to transfer a flexible tubular seal of the type employed in sealing bottles and the like from one station to another in a machine for applying the same, a pick-up head having a pair of spaced fingers adapted to enter and carry a tubular member from one station to another, rotary means carrying said head in a circular path between the stations, means biasing said fingers apart to stretch the member thereon as said head moves in said path, and means disposed to actuate said fingers in correlation to movement of said head in passing the stations to effect relative closing of said fingers against said biasing means to enter and release the tubular member at the respective stations.

4. In seal transferring apparatus of the class described adapted to transfer a flexible tubular seal of the type employed in sealing bottles and the like from one station to another in a machine for applying the same, means to position a semi-open flexible tubular seal at a transfer station with the axis of the seal orientated for seal pick-up and with the oppositely spaced folds of the seal open and free for receiving pick-up means, a pick-up head having spaced fingers adapted to enter said open folds of the seal at said station, means to separate said fingers to expand the seal thereon, a rotary member carrying said pick-up head and adapted to transfer the same and said seal in an arcuate path from said first transfer station to a second transfer station, means mounting said pick-up head upon said rotary member for rotation of the head upon an axis generally radial of the axis of rotation of said member, means to effect the correlated rotation of said rotary member and of said head, said fingers being normally tangential to the circular path of said head as they pass said transfer stations, and said drive means rotating said head and said fingers approximately 180° during the translation thereof between said stations whereby said fingers move forwardly into a seal at said first station and are reversed in direction as they approach said second transfer station to facilitate stripping of the seal therefrom, and means to remove the seal from said fingers at said second transfer station.

5. In seal transferring apparatus of the class described adapted to transfer a flexible tubular seal of the type employed in sealing bottles and the like from one station to another in a machine for applying the same, means to position a semi-open flexible tubular seal at a transfer station with the axis of the seal orientated for seal pick-up and with the oppositely spaced folds of the seal open and free for receiving pick-up means, a pick-up head having a pair of substantially parallel spaced fingers at least one of which is pivotally supported for movement toward and away from the other, a spring disposed to bias said fingers apart, cam means disposed at said transfer station to actuate the movable finger to close the same toward the other as the head passes said station and effect entry of said fingers into the open folds of the seal, means to transfer said head and the seal carried thereby from said first transfer station to a second transfer station, means to give a rotational movement to said head during said transfer to move said fingers from a forward direction effecting entry into the seal at said first transfer station to a reversed direction as they approach said second transfer station to facilitate stripping of the seal therefrom, cam means at said second station to actuate the movable finger to close the same toward the other as the head passes said station to provide for stripping of the seal from the fingers, and means to remove the seal from said fingers at said second transfer station.

6. In seal transferring apparatus of the class described adapted to transfer a flexible tubular seal of the type employed in sealing bottles and the like from one station to another in a machine for applying the same, means to position a semi-open flexible tubular seal at a transfer station with the axis of the seal orientated for seal pick-up and with the oppositely spaced folds of the seal open and free for receiving pick-up means, a pick-up head having spaced fingers adapted to enter said open folds of the seal at said station, means to separate said fingers to expand the seal thereon, a rotary member carrying said pick-up head and adapted to transfer the same and said seal in an arcuate path from said first transfer station to a second transfer station, means mounting said pick-up head upon said rotary member for rotation of the head upon an axis generally radial of the axis of rotation of said member, means to effect the correlated rotation of said rotary member and of said head, said fingers being normally tangential to the circular path of said head as they pass said transfer stations, and said drive means rotating said head and said fingers approximately 180° during the translation thereof between said stations whereby said fingers move forwardly into a seal at said first station and are reversed in direction as they approach said second transfer station to facilitate stripping of the seal therefrom, said drive means additionally providing an increase in the acceleration and deceleration rates for said 180° rotation of said head and fingers to effect a dwell in the rotation of the head upon its axis when passing said transfer stations whereby the fingers are maintained tangential to the circumferential translatory path of the head during pick-up of a seal by the fingers and stripping of a seal therefrom, and means to remove the seal from said fingers at said second transfer station.

7. In seal transferring apparatus of the class described adapted to transfer a flexible tubular seal of the type employed in sealing bottles and the like from one station to another in a machine for applying the same, a rotary member, a seal pick-up head carried by said member and having spaced fingers thereon adapted to enter and carry a seal from a first transfer station to a second transfer station adjacent said member, a rotary shaft supporting said head upon said member and adapted to hold said fingers in a plane substantially tangential to the circumferential path of translation of said head during rotation of said member as the head passes said stations, a continuous gear disposed substantially axially of said rotary member and normally held against rotation, a gear on said shaft connected by a gear train to said first named gear whereby turning of said rotary member effects rotation of said head upon said shaft in correlation to said rotary member to reverse the direction of said fingers at said second transfer station and facilitate stripping of the seal therefrom, and means to oscillate said first named gear to cause the same to rotate with said rotary member as the head approaches and passes each station and to return the gear to normal position intermediate said periods of rotation.

8. In seal transferring apparatus of the class described adapted to transfer a flexible tubular seal of the type employed in sealing bottles and the like from one station to another in a machine for applying the same, a rotary member, a drive for said member, a first transfer station and a second transfer station adjacent said rotary member and disposed 180° apart on diametrically opposite sides thereof, a seal pick-up head carried by said member and having spaced fingers thereon adapted to enter and carry said seal from said first transfer station to said second transfer station, a rotary shaft supporting said head upon said member and adapted to hold said fingers in a plane substantially tangential to the circumferential path of translation of said head during rotation of said member as the head passes said stations, a continuous gear disposed concentric of said rotary member and normally held against rotation, a gear on said shaft connected by a gear train to said first named gear whereby turning of said rotary member effects rotation of said head upon said shaft in correlation to said rotary member to reverse the direction of said fingers at said second transfer station and facilitate stripping of the seal therefrom, a crank connected to oscillate said first named gear, and a drive for said crank interlocked with the drive for said rotary member whereby said first named gear rotates with said member as the head approaches and passes each transfer station and returns to normal position intermediate said periods of rotation.

9. In seal transferring apparatus of the class described adapted to transfer a flexible tubular seal of the type employed in sealing bottles and the like from one station to another in a machine for applying the same, a pick-up head having a pair of spaced substantially parallel fingers adapted to enter and carry a tubular seal from one station to another, said pick-up head having a pivotal arm carrying at least one of said fingers, rotary means carrying said head in a circular path between the stations, spring means biasing said fingers apart to stretch the seal thereon as said head moves in said path, and means disposed to actuate said fingers in correlation to movement of said head in passing the stations to effect relative closing of said fingers against said biasing means to enter and release the tubular seal at the respective stations.

10. In seal transferring apparatus of the class described adapted to transfer a flexible tubular seal of the type employed in sealing bottles and the like from one station to another in a machine for applying the same, a pick-up head having a pair of spaced substantially parallel fingers adapted to enter and carry a tubular seal from one station to another, said pick-up head having a pivotal arm carrying at least one of said fingers, rotary means carrying said head in a circular path between the stations, spring means biasing said fingers apart to stretch the seal thereon as said head moves in said path, and means including a lever linked to said spring biased arm, and a fixed cam disposed to actuate said lever as the head approaches and passes each station to actuate said fingers in correlation to movement of said head in passing the stations to effect relative closing of said fingers against said biasing means to enter and release the tubular seal at the respective stations.

References Cited in the file of this patent
UNITED STATES PATENTS

| | | |
|---|---|---|
| 928,172 | Bernardin | July 13, 1909 |
| 2,224,975 | McNamara | Dec. 17, 1940 |
| 2,451,975 | Rayburn et al. | Oct. 19, 1948 |
| 2,546,374 | Rayburn et al. | Mar. 27, 1951 |
| 2,573,660 | Brownell | Oct. 30, 1951 |
| 2,580,472 | Smith | Jan. 1, 1952 |
| 2,692,693 | Newburg | Oct. 26, 1954 |